US012574296B2

(12) United States Patent　　　(10) Patent No.:　US 12,574,296 B2
He et al.　　　　　　　　　　　　(45) Date of Patent:　　Mar. 10, 2026

(54) METHOD AND SYSTEM FOR CONSTRUCTING AND ANALYZING KNOWLEDGE GRAPH OF WIRELESS COMMUNICATION NETWORK PROTOCOL, AND DEVICE AND MEDIUM

(71) Applicant: PURPLE MOUNTAIN LABORATORIES, Nanjing (CN)

(72) Inventors: Shiwen He, Nanjing (CN); Liangpeng Wang, Nanjing (CN); Xiangwu Zhang, Nanjing (CN); Zhijie Wu, Nanjing (CN); Yiting Yang, Nanjing (CN); Sui Zou, Nanjing (CN); Yongming Huang, Nanjing (CN); Yunshan Yi, Nanjing (CN); Xiaohu You, Nanjing (CN)

(73) Assignee: PURPLE MOUNTAIN LABORATORIES, Nanjing (CN)

( * ) Notice: Subject to any disclaimer, the term of this patent is extended or adjusted under 35 U.S.C. 154(b) by 313 days.

(21) Appl. No.: 18/283,784

(22) PCT Filed: Oct. 15, 2021

(86) PCT No.: PCT/CN2021/123976
§ 371 (c)(1),
(2) Date: Sep. 22, 2023

(87) PCT Pub. No.: WO2022/205833
PCT Pub. Date: Oct. 6, 2022

(65) Prior Publication Data
US 2024/0163684 A1　　May 16, 2024

(30) Foreign Application Priority Data
Mar. 29, 2021　(CN) ........................ 202110330984.X

(51) Int. Cl.
*H04L 41/142* (2022.01)
*G06F 16/36* (2019.01)
*G06F 16/901* (2019.01)
*G06N 5/02* (2023.01)

*H04L 41/12* (2022.01)
*H04L 41/14* (2022.01)
*H04L 41/16* (2022.01)
*H04L 41/22* (2022.01)

(52) U.S. Cl.
CPC ........ *H04L 41/142* (2013.01); *G06F 16/9024* (2019.01); *G06N 5/02* (2013.01);
(Continued)

(58) Field of Classification Search
CPC .............. G06F 16/367; G06F 16/9024; G06N 5/02–025; H04W 16/22–225; H04W 24/00–10; H04L 41/12–16
See application file for complete search history.

(56) References Cited

U.S. PATENT DOCUMENTS

2011/0035418 A1　2/2011　Butler, IV
2017/0124193 A1*　5/2017　Li ......................... G06F 16/951
(Continued)

FOREIGN PATENT DOCUMENTS

CN　　109918512 A　　6/2019
CN　　109992673 A　　7/2019
(Continued)

*Primary Examiner* — Brendan Y Higa
(74) *Attorney, Agent, or Firm* — The Sun IP Law

(57) ABSTRACT

The disclosure discloses a method and system for constructing and analyzing a knowledge graph of a wireless communication network protocol, and a device and a medium. The method for constructing and analyzing the knowledge graph of the wireless communication network protocol includes: defining entities and a relation between the entities according to endogenous factors of a wireless communication network protocol, defining a triplet based on the defined entities and the defined relation between the entities, and constructing a knowledge graph of the endogenous factors of the wireless communication network protocol based on the defined triplet; and performing association analysis between any nodes in the knowledge graph to acquire an association relation hidden between the endogenous factors of the wireless communication network protocol.

11 Claims, 3 Drawing Sheets

(52) U.S. Cl.
CPC .............. *H04L 41/12* (2013.01); *H04L 41/14*
(2013.01); *H04L 41/145* (2013.01); *H04L*
*41/16* (2013.01); *H04L 41/22* (2013.01); *G06F*
*16/367* (2019.01)

(56) References Cited

U.S. PATENT DOCUMENTS

| | | | |
|---|---|---|---|
| 2022/0200844 A1* | 6/2022 | Wang ...................... | H04L 41/22 |
| 2023/0142573 A1* | 5/2023 | Tian ...................... | H04L 41/085 |
| | | | 706/46 |
| 2023/0254244 A1* | 8/2023 | Cao .................... | H04L 12/4633 |

FOREIGN PATENT DOCUMENTS

| | | |
|---|---|---|
| CN | 110856186 A | 2/2020 |
| CN | 112100346 A | 12/2020 |
| CN | 112714032 A | 4/2021 |

* cited by examiner

METHOD AND SYSTEM FOR CONSTRUCTING AND ANALYZING KNOWLEDGE GRAPH OF WIRELESS COMMUNICATION NETWORK PROTOCOL, AND DEVICE AND MEDIUM

CROSS-REFERENCE TO RELATED APPLICATION

The disclosure claims priority to Chinese patent application No. 202110330984.X, filed on Mar. 29, 2021 and entitled "Method and System for Constructing and Analyzing Knowledge Graph of Wireless Communication Network Protocol, and Device and Medium", the disclosure of which is hereby incorporated by reference in its entirety.

TECHNICAL FIELD

The disclosure relates to the technical field of intelligent wireless communication networks, in particular to a method and system for constructing and analyzing a knowledge graph of a wireless communication network protocol, and a device and a medium.

BACKGROUND

Network structures, terminal types, terminal behaviors, data service requirements, and system resources of future wireless communication networks have the characteristics of high dynamics, strong timeliness, mutual coupling, etc. The interconnection and intercommunication of wireless communication knowledge are achieved by effectively clarifying an association relation between these characteristics and endogenous factors of a communication network protocol, which is helpful for the efficient management of wireless communication network resources, network operation and maintenance (O&M), and theoretical research on intelligent wireless communication. Due to the multi-source heterogeneity and loose organizational structure of wireless communication data, the network structure has the characteristic of coupling hierarchy with flattening, which brings significant challenges to the knowledge interconnection in the big data environment. The association relation between various endogenous factors in the existing communication network architecture is usually a "black core", so it is difficult for researchers to dynamically understand the network's internal processes and dynamic behaviors in a visual, hierarchical and structured manner. In addition, the existing wireless network researches are focused on learning knowledge of a specific layer, such as a physical layer, a data link layer, and layers above the core network, and a relation between layers and a relation between elements of the same layer are not well visually presented. The key to deep understanding of the communication network is how to present the endogenous factors and an endogenous association relation in a wireless network communication mechanism in an easily understandable visual manner.

SUMMARY

A first aspect of the disclosure relates to a method for constructing and analyzing a knowledge graph of a wireless communication network protocol, which includes:

defining entities and a relation between the entities according to endogenous factors of a wireless communication network protocol, the endogenous factors of the wireless communication network protocol comprising data fields and indicators, of a core network, which are specified by the wireless communication network protocol;

defining a triplet based on the defined entities and the defined relation between the entities;

constructing, according to the defined triplet, a knowledge graph of the endogenous factors of the wireless communication network protocol, the knowledge graph having a topology; and performing association analysis between any nodes in the knowledge graph to acquire an association relation hidden between the endogenous factors of the wireless communication network protocol.

A second aspect of the disclosure relates to a system for constructing and analyzing a knowledge graph of a wireless communication network protocol, which includes:

a knowledge graph construction unit, configured to define entities and a relation between the entities according to endogenous factors of a wireless communication network protocol, define a triplet based on the defined entities and the defined relation between the entities, and construct, according to the defined triplet, a knowledge graph of the endogenous factors of the wireless communication network protocol, wherein the knowledge graph has a topology, and the endogenous factors of the wireless communication network protocol comprise data fields and indicators, of a core network, which are specified by the wireless communication network protocol; and an association analysis unit, connected to the knowledge graph construction unit and configured to perform association analysis between any nodes in the knowledge graph to acquire an association relation hidden between the endogenous factors of the wireless communication network protocol.

A third aspect of the disclosure relates to an electronic device, which includes a memory, a processor, and a computer program stored in the memory and runnable on the processor. The processor implements the method for constructing and analyzing the knowledge graph of the wireless communication network protocol in the above aspect when executing the program.

A fourth aspect of the disclosure relates to a computer readable storage medium, on which a computer executable instruction is stored, and when executed by a processor, the computer executable instruction implements the method for constructing and analyzing the knowledge graph of the wireless communication network protocol in the above aspect.

BRIEF DESCRIPTION OF THE DRAWINGS

FIG. 1 is a flowchart of a method of the disclosure.

FIG. 2 is a local schematic diagram of a knowledge graph before an update according to an embodiment of the disclosure.

DETAILED DESCRIPTION OF THE EMBODIMENTS

Figure 3:
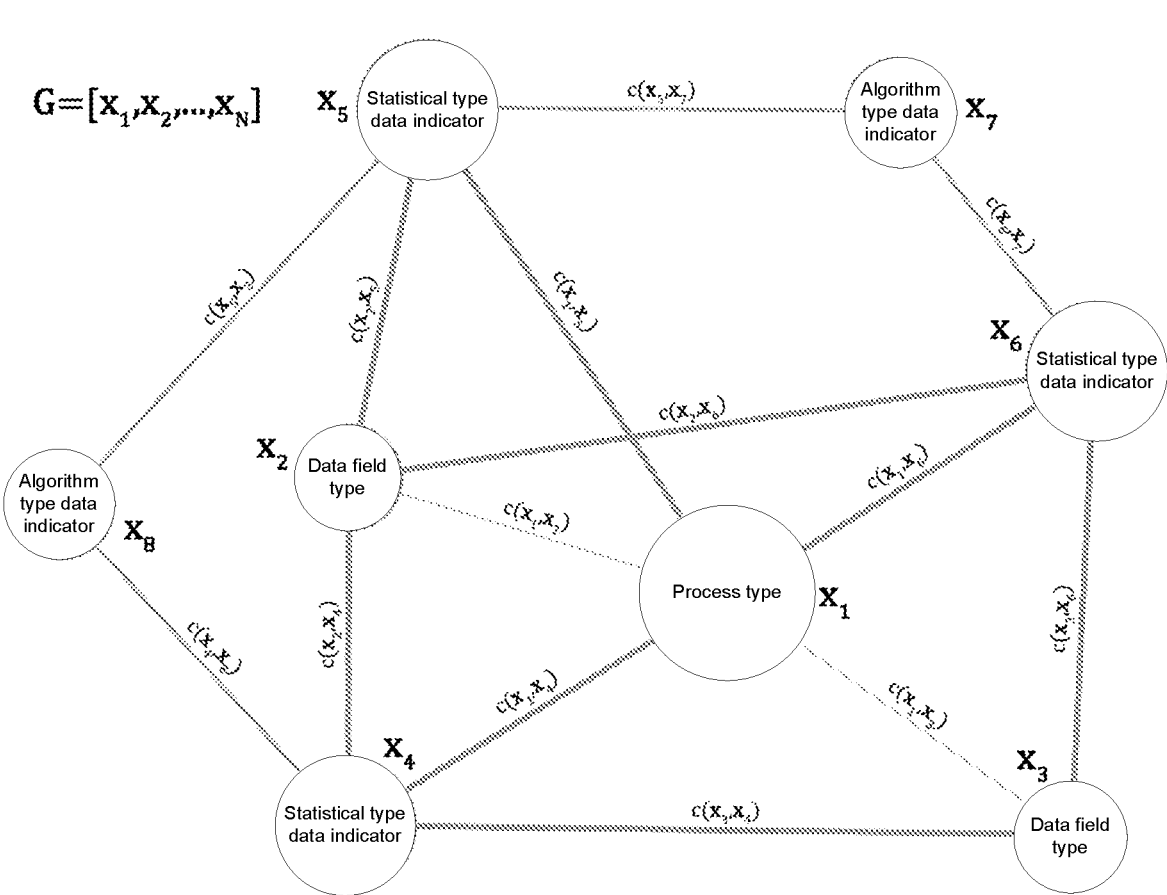
FIG. 3 is a local schematic diagram of a knowledge graph after an update according to an embodiment of the disclosure.

A method and system for constructing and analyzing a knowledge graph of a wireless communication network protocol, as well as a device and a medium of the disclosure will be further described and explained below in combination with the drawings and embodiments.

For the defect of the problem of a "black core" of an association relation between endogenous factors in a communication network architecture in the related art, in the disclosure, by establishing a knowledge graph of endogenous factors of a wireless communication network protocol, and introducing a node sparse representation algorithm and a cosine similarity calculation and node association analysis method, which are based on a structure of the knowledge graph, graph structure information contained in the knowledge graph is intensely mined, quantitative feature representation is performed on nodes of the knowledge graph and a connection relation, and analysis and mining of an association relation between the nodes are completed.

Figure 1:
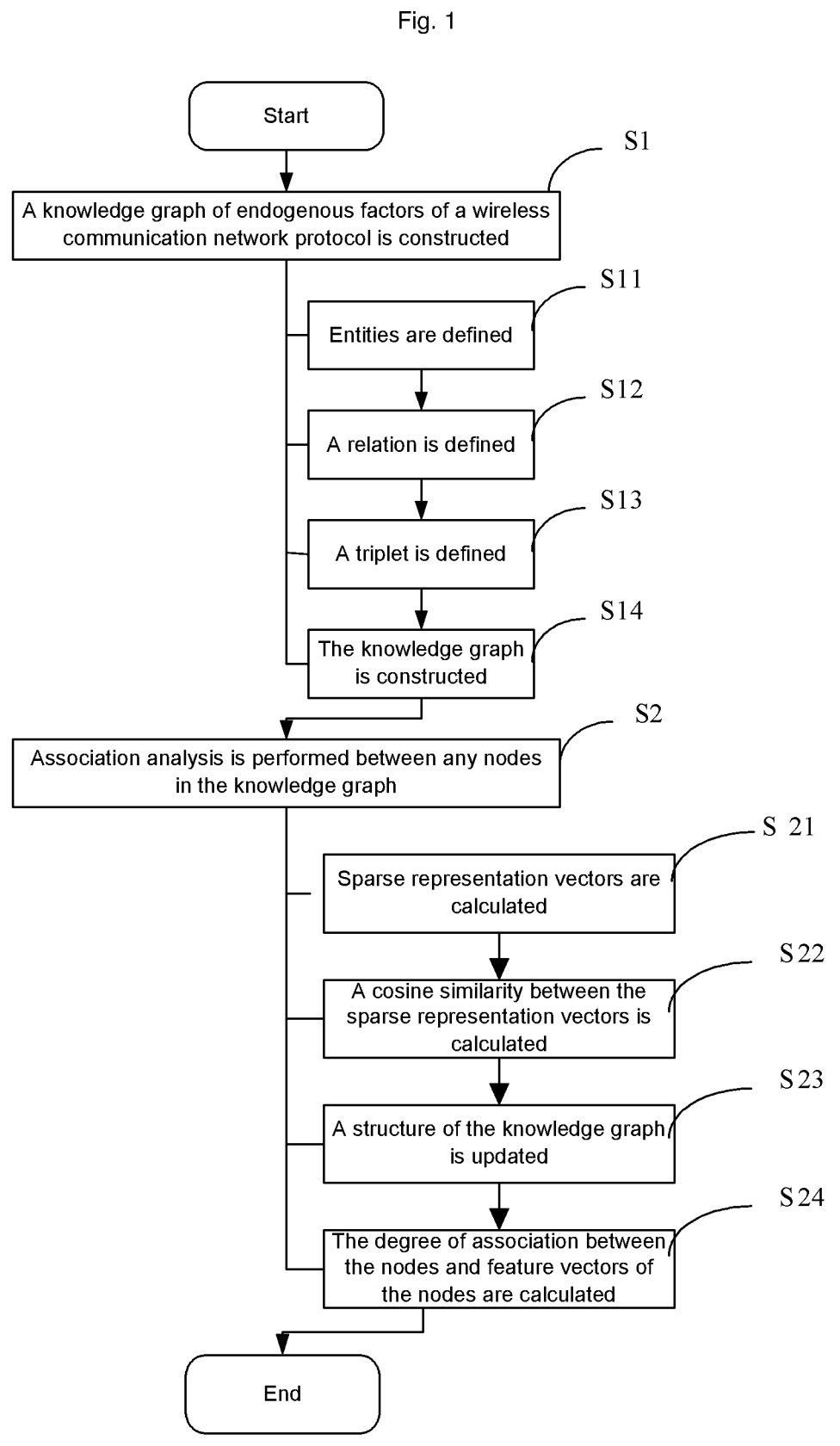

As shown in FIG. 1, a method for constructing and analyzing a knowledge graph of a wireless communication network protocol includes the following operations.

At S1, a knowledge graph of endogenous factors of a wireless communication network protocol is constructed. Entities and a relation between the entities are defined according to the endogenous factors of the wireless communication network protocol, a triplet is defined based on the defined entities and the defined relation between the entities, and the knowledge graph of the endogenous factors of the wireless communication network protocol is constructed based on the defined triplet, wherein the knowledge graph has a topology. The endogenous factors of the wireless communication network protocol include data fields and indicators, of a core network, which are specified in the wireless communication network protocol. The constructed knowledge graph of the endogenous factors of the wireless communication network protocol intuitively shows an association rule between the data fields and core network indicators specified in the wireless communication protocol. The association rule is represented in the form of a knowledge graph. In the knowledge graph, the data fields and indicators are represented by nodes, and the association rules between the data fields and indicators are represented by the relation between the entities, which provides a basis for the subsequent research on association analysis methods. The step of constructing the knowledge graph includes the following sub-steps.

At S11, the entities are defined. The endogenous factors of the wireless communication network protocol are acquired, entity types are determined according to the endogenous factors of the wireless communication network protocol, and the entities are defined according to the entity types. Based on the data fields and indicators of the core network, which are specified in the wireless communication protocol such as a 3rd Generation Partnership Project (3GPP) protocol, four entity types are established. These entity types include a process type, a data field type, a statistical type data indicator, and an algorithm type data indicator. The signaling process type serves as an anchor point for connecting each interface. The entity contains entity attributes configured to reflect all possible names, features and parameters of an entity object, the features include the entity type and a word length, and the parameters include numerical values of the entity. The entity attributes are configured to describe the entity and represent a mapping relation between the entity and attribute values.

At S12, a relation between the entities is defined. The relation between the entities is classified into a process relation, a conditional relation, and an algorithm relation according to the wireless communication network protocol, and the relation between the entities is defined as at least one of the process relation, the conditional relation, and the algorithm relation according to the endogenous factors of the wireless communication network protocol. The process relation describes the correlation between an entity of the data field type and an entity of the process type. The conditional relation describes specific values of the data fields associated with the entity of the statistical type data indicator when the entity of the statistical type data indicator takes effect. The algorithm relation describes a calculation method for converting the entity of the statistical type data indicator into the entity of the algorithm type data indicator.

At S13, a triplet is defined. The entity includes a head entity and a tail entity. A universal triplet (head, relation, tail) for an entity wireless communication protocol is constructed based on the relation between the entities defined in S11 and S12, and the triplet has a connection relation, that is, the triplet is composed of the relation between the entities. Herein, head is the head entity in the triplet and tail is the tail entity in the triplet. The head entity and the tail entity in each triplet belong to one of the following entity types: process type, data field type, statistical type data indicator, or algorithm type data indicator. relation is the relation between the entities belongs to at least one of the following relations: process relation, conditional relation, or algorithm relation.

At S14, the knowledge graph is constructed. The head entity and the tail entity of the triplet in S13 serve as the nodes of the knowledge graph. The relation between the entities serves as an edge between the nodes, which establishes a connection relation between the nodes. All entity nodes that have relations are connected to obtain the knowledge graph of the endogenous factors of the wireless communication network protocol. The topology of the knowledge graph is such that each node represents one data field or indicator of the core network. The nodes in the knowledge graph are classified into two types, namely isolated nodes and non-isolated nodes. The isolated nodes refer to the nodes that have no connection relation with all other nodes in the knowledge graph, otherwise they are called the non-isolated nodes. Therefore, the construction of the knowledge graph based on the endogenous factors of the wireless communication network protocol is completed.

At S2, association analysis is performed between any nodes in the knowledge graph to acquire an association relation hidden between the endogenous factors of the wireless communication network protocol. In one example, through the adoption of an association analysis model method, sparse representation vectors of the nodes are obtained by calculating random state weights of the nodes, the connection relation established between any nodes in the knowledge graph through the wireless communication network protocol is quantified and replaced with a cosine similarity between the sparse representation vectors, and then association vectors of the nodes are calculated. The association vectors are configured to calculate feature vectors of the nodes. The quantitative representation of the knowledge graph is completed by the feature vectors of the nodes, which facilitates mining the association relation between the nodes, and then the association relation hidden between the endogenous factors of the wireless communication network protocol is acquired. The association analysis based on the knowledge graph of the endogenous factors of the wireless communication network protocol aims to calculate the similarity that quantifies the connection relation between the nodes. It also aims to determine the degree of association between any node and all other nodes to support the representation learning of the feature vectors of the nodes. This further enables mining of the association relation between the intra-class nodes. To achieve the purpose, firstly, the sparse representation vectors of the nodes are obtained according to the topology of the knowledge graph constructed in S1, and then the quantification of the connection relation between the nodes is realized by calculating the cosine similarity between the sparse representation vectors. The relation determined in the original knowledge graph by the protocol is replaced with the quantified connection relation between the nodes to complete the update of the structure of the knowledge graph. The association vectors of the nodes are calculated in combination with the updated topology of the knowledge graph and the similarity, then the feature vectors of the nodes are calculated, and the quantitative representation of the knowledge graph is completed through the feature vectors of the nodes, which provides technical support for the subsequent deep mining of the association relation between the nodes. In calculating the connection relation between the nodes through cosine similarity quantification, the association between the nodes without direct connection relation in the original knowledge graph is also inferred.

In the disclosure, the association rule between the data fields and indicators is established according to the wireless communication network protocol, and the knowledge graph is constructed according to the association rule. The association analysis of the endogenous factors is realized based on the knowledge graph and the structure of the knowledge graph is updated. The association relation between various endogenous factors is deeply mined based on the node feature representation and the quantitative representation of the connection relation of the knowledge graph, thereby providing a strong theoretical basis for logical inference between the endogenous factors in a complex relational network. The problem of the "black core" of the association relation between the endogenous factors in the communication network architecture is solved, and the research gap in the field of association analysis of wireless communication network protocols is filled, thereby providing a calculation basis for node classification and other aspects.

The step of performing association analysis between nodes in the knowledge graph includes the following sub-steps.

At S21, the sparse representation vectors of the nodes are calculated. The sparse representation vector of each node is obtained by calculating a random state weight of each node in the knowledge graph. In an N×N dimensional sparse representation matrix $G=[x_1, x_2, \ldots, x_N]$ of the nodes of the knowledge graph, N is the total number of nodes, $x_u=[v_1 r_{u,1}, v_2 r_{u,2}, \ldots, v_N r_{u,N}]^T$ is the sparse representation vector of the node u, $v_u$ is the random state weight of the node u, $r_{u,v}$ represents a connection situation between the node u and the node v, and when there is a connection relation, $r_{u,v}=1$, otherwise $r_{u,v}=0$.

The random state weights of all the nodes are obtained through a series of iterative operations. For ease of description, the random state weights of all the nodes after the n+1-th iteration are $v_{n+1}=[v_1, v_2, \ldots, v_N]^T$, and $v_{n+1}$ is obtained through the following iterative formula:

$$v_{n+1}=Tv_n \qquad (1)$$

where n represents the number of iterations of the random state weight, an initial iteration value is $$v_0 = \left[\frac{1}{N}, \frac{1}{N}, \cdots, \frac{1}{N}\right]^T,$$

and T is a random state transition probability correction matrix and a calculation method is as follows:

$$T = \alpha S + \frac{1-\alpha}{N} ee^T \qquad (2)$$

where $\alpha$ is a random state transition probability parameter, S is a random state transition probability matrix, and e is column vectors whose values are all 1. The iteration terminates when a condition $\|v_{n+1}-v_n\|<o$ is met. A random state transition probability matrix is $S=[r_1, r_2, \ldots, r_N]$, and a random state transition probability vector for converting a non-isolated node $\zeta$ to any other node is $$r_\zeta = \left[\frac{r_{\zeta,1}}{\sum\limits_{i=1}^{N} r_{\zeta,i}}, \frac{r_{\zeta,2}}{\sum\limits_{i=1}^{N} r_{\zeta,i}}, \ldots, \frac{r_{\zeta,N}}{\sum\limits_{i=1}^{N} r_{\zeta,i}}\right]^T.$$

A random state transition probability vector for converting an isolated node $\xi$ to any other node is $$r_\xi = \left[\frac{1}{N}, \frac{1}{N}, \cdots, \frac{1}{N}\right]^T.$$

The topological information of the knowledge graph is transferred several times by iteration in this step, so that the nodes with more connection relations in the knowledge graph have larger random state weights.

At S22, the cosine similarity between the sparse representation vectors is calculated. The connection relation between the nodes is quantified by calculating the cosine similarity between the sparse representation vectors. The cosine similarity $c(x_u, x_v)$ between the sparse representation vector $x_u$ and the sparse representation vector $x_v$ is given by the following formula:

$$c(x_u, x_v) = \frac{\sum\limits_{i=1}^{N} x_{u,i} \times x_{v,i}}{\sqrt{\sum\limits_{i=1}^{N} (x_{u,i})^2} \times \sqrt{\sum\limits_{i=1}^{N} (x_{v,i})^2}} \qquad (3)$$

At S23, the structure of the knowledge graph is updated. The relation between the entities defined by the endogenous factors of the wireless communication network protocol in the original knowledge graph is replaced with the connection relation between the nodes quantified by the cosine similarity between the sparse representation vectors of the nodes, which updates the knowledge graph's structure. It is set that there is a connection relation between the nodes having cosine similarity values not lower than a cosine similarity threshold $\eta$ and there is no connection relation between a node u and a node v having a cosine similarity value lower than the threshold $\eta$, and $c(x_u, x_v)=0$. The connection relation determined by the protocol in the original knowledge graph is replaced with the cosine similarity value to realize the quantification of the connection relation between the nodes in the knowledge graph. There is the cosine similarity between the sparse representation vectors of any entity nodes, that is, the nodes are connected in pairs, but some weakly connected nodes need to be disconnected if the cosine similarity value is lower than the cosine similarity threshold η, to realize the update of the structure of the graph.

At S24, the degree of association between the nodes and the feature vectors of the nodes are calculated. An association vector of each node is calculated based on the updated structure of the knowledge graph and the cosine similarity, and the feature vector of the node is calculated through the association vector. The feature vector of the node is obtained by iterative calculation, so the iterative calculation method of the feature vector $p_{u,t+1}$ of the node u at time point t+1 is:

$$p_{u,t+1}=p_{u,t}+\delta(t)f_{offset,t}(u) \quad (4)$$

where $p_{u,t}$ is the feature vector of the node u at time point t, $$\delta(t) = \beta^{\frac{t}{K}}$$

is a learning rate function about time point t and its value decreases with the increase of time, β is an attenuation factor, K is a constant of the number of attenuation steps, and $f_{offset,t}(u)$ is a feature offset vector of the node u at time point t. The value of the feature vector $p_{u,0}$ of the node u at time point t=0 is given randomly. The condition for determining the termination is $\max_{u \in v}(\|p_{u,t+1}-p_{u,t}\|) < \varepsilon$, where $\|\bullet\|$ represents a $L_2$ norm. The iteration here ensures that the obtained feature vector is in a steady state, and the feature offset has approached 0, which is near the minimum value. The role of the feature vector is to quantify a conceptual abstract knowledge graph into a matrix form that can be described and calculated by the feature vector, for example, G=(A, X), where A is an adjacency matrix and X is composed of each node's feature vector.

From the formula (4), the feature offset vector of the node needs to be calculated to calculate the feature vector of the node. The feature offset vector $f_{offset,t}(u)$ of the node u at time point t is calculated and obtained by an association vector $f_{assoc,t}(u)$ and a separation vector $f_{sep,t}(u)$ acting on the node at time point t.

$$f_{offset,t}(u)=f_{assoc,t}(u)+f_{sep,t}(u) \quad (5)$$

(1) Calculation of the Association Vector

The association vector $f_{assoc,t}(u)$ of the node u is expressed as the sum of coherence vectors of all the nodes connected to the node u, and its calculation formula is:

$$f_{assoc,t}(u)=\sum\nolimits_{v \in \Re_u} f_{agg,t}(p_{u,t}p_{v,t}x_u,x_v) \quad (6)$$

where $\Re_u$ is a set of nodes that have a connection relation with the node u, $f_{agg,t}(p_{u,t}, p_{v,t}, x_u, x_v)$ is the coherence vector between the node u and the node v at time point t, and the calculation method is:

$$f_{agg,t}(p_{u,t}, p_{v,t}, x_u, x_v) = \frac{c(x_u, x_v)}{l_e}\|p_{u,t}-p_{v,t}\|^2\overrightarrow{p_{u,t}p_{v,t}} \quad (7)$$

where $l_e$ is the ideal length of an edge e between the node u and the node v, $c(x_u, x_v)$ is the cosine similarity between the sparse representation vector $x_u$ of the node u and the sparse representation vector $x_v$ of the node v, $\|p_{u,t}-p_{v,t}\|$ is an Euclidean distance from the node u to the node v, namely the $L_2$ norm, and $\overrightarrow{p_{u,t}p_{v,t}}$ is the unit vector from the node u to the node v. The ideal length $l_e$ sis obtained by calculating the best distance:

$$l_e = C\sqrt{\frac{A}{N}} \quad (8)$$

where C is the constant, A is the size of a distribution area of the nodes of the knowledge graph, and N is the total number of nodes in the knowledge graph.

The norm of the association vector $f_{assoc,t}(u)$ of the node u represents the degree of association $\|f_{assoc,t}(u)\|$ of the node u, which describes the association relation between the node U and other nodes at time point t.

(2) Calculation of Separation Vector

The separation vector $f_{sep,t}(u)$ of the node u is expressed as the sum of discrete vectors of all the nodes disconnected to the node u, namely:

$$f_{sep,t}(u)=\sum\nolimits_{v \in V \& v \notin \Re_u} f_{disp,t}(p_{u,t}p_{v,t}) \quad (9)$$

where V is a set of all the nodes, $f_{disp,t}(p_{u,t}p_{v,t})$ is the discrete vector between the node u and the node v at time t, and the calculation method is:

$$f_{disp,t}(p_{u,t}, p_{v,t}) = \frac{l_e^2}{\|p_{u,t} - p_{v,t}\|}\overrightarrow{p_{u,t}p_{v,t}} \quad (10)$$

where $l_e$ is the ideal length of the edge e between the node u and the node v, its calculation formula is formula (8), $\|p_{u,t}-p_{v,t}\|$ is the Euclidean distance from the node u to the node v, namely the $L_2$ norm, and $\overrightarrow{p_{u,t}p_{v,t}}$ is the unit vector from the node u to the node v.

The disclosure establishes the knowledge graph of the endogenous factors of the wireless communication network protocol. It also introduces the node sparse representation algorithm, the cosine similarity calculation and node association analysis method based on the knowledge graph's structure. The graph structure information contained in the knowledge graph is deeply mined. Quantitative feature representation is achieved on the nodes and the connection relation of the knowledge graph. Finally, analysis and mining of the association relation between the nodes are completed. The disclosure also uses an association analysis model to quantify the abstract knowledge graph of the wireless communication network protocol into a matrix form that is described and calculated by the feature vectors. The knowledge graph in this representation form is more easily and extendedly applied to entity prediction, relation prediction, recommendation algorithm, and semantic search scenarios.

It should be noted that the steps in the above embodiment are shown sequentially as indicated by arrows in FIG. 1, but they are not necessarily performed sequentially in an order indicated by the arrows. Unless otherwise specified herein, there is no strict order restriction on the execution of these steps. These steps can be executed in other orders. Moreover, some of the steps in FIG. 1 may include multiple steps or stages. The multiple steps or stages are not necessarily executed at the same moment, but may be executed at different moments. The sequence of execution of these steps or stages is not necessarily performed sequentially, but may be executed alternately or alternately with other steps or at least part of steps or stages in other steps.

A system for constructing and analyzing a knowledge graph of a wireless communication network protocol is arranged in any required position in the network, and is executed in a local server. In addition, the system may be arranged in a server and a client, or the method in the disclosure is implemented through an algorithm. The system for constructing and analyzing the knowledge graph of the wireless communication network protocol includes a knowledge graph construction unit and an association analysis unit.

The knowledge graph construction unit is configured to define entities, a relation between the entities, and a triplet according to endogenous factors of a wireless communication network protocol. It constructs a knowledge graph of the endogenous factors of the wireless communication network protocol, wherein the knowledge graph has a topology through the triplet.

The association analysis unit is connected to the knowledge graph construction unit and configured to obtain sparse representation vectors of the nodes by calculating random state weights of the nodes, quantifying and replacing the connection relation established between any nodes in the knowledge graph through the wireless communication network protocol with a cosine similarity between the sparse representation vectors, and then calculate association vectors of the nodes. The association vectors are configured to calculate the feature vectors of the nodes. The feature vectors are configured for quantitative representation of the knowledge graph. The association analysis unit may include a sparse representation vector calculation module, a cosine similarity calculation module, an update module, and a feature vector calculation module connected in sequence.

The sparse representation vector calculation module is configured to calculate the sparse representation vector of each node according to the knowledge graph constructed by the knowledge graph construction unit. The cosine similarity calculation module is configured to calculate the cosine similarity between the sparse representation vectors of the nodes to realize quantification of the connection relation between the nodes. The update module is configured to replace the connection relation in the original knowledge graph with the quantified cosine similarity to complete the update of a knowledge graph structure. The feature vector calculation module is configured to calculate association vectors of the nodes in combination with the updated topology of the knowledge graph and the similarity, and then calculate the feature vectors of the nodes through the association vectors. The feature vectors are configured for quantitative representation of the knowledge graph.

The specific limitations of the system for constructing and analyzing the knowledge graph of the wireless communication network protocol may refer to the limitations of the above method for constructing and analyzing the knowledge graph of the wireless communication network protocol, which will not be elaborated herein. Part or all of units and modules of the above system for constructing and analyzing the knowledge graph of the wireless communication network protocol may be implemented using software, hardware and a combination thereof. The above modules are embedded in the hardware form or independent of a processor in a computer device, and are also stored in a memory of the computer device in the software form, so that the processor calls and executes operations corresponding to the above modules.

An electronic device includes a memory, a processor, and a computer program stored in the memory and runnable on the processor. The processor implements any of the above methods for constructing and analyzing the knowledge graph of the wireless communication network protocol when executing the program. The memory may be of various types, which may be a Random Access Memory (RAM), a Read Only Memory (ROM), a flash memory, etc. The processor may be of various types, for example, a central processing unit, a microprocessor, a digital signal processor, or an image processor.

A computer-readable storage medium is provided, on which a computer-executable instruction is stored, and when executed by a processor, the computer executable instruction is configured to implement any one of the above methods for constructing and analyzing the knowledge graph of the wireless communication network protocol. The storage medium includes: various media capable of storing program codes such as a USB disk, a mobile hard disk drive, a ROM, a RAM, a magnetic disk or a compact disc.

EMBODIMENT

In this embodiment, association analysis of control plane data and indicators of N1N2 interfaces of a core network is further described. A knowledge graph of endogenous factors of a wireless communication network protocol is constructed by graph database technology, and operations such as query, storage and processing of an association relation of nodes in the knowledge graph are implemented by database query languages. An association analysis model for the endogenous factors is established and verified in a Python 3.6 environment.

At S1, the knowledge graph of the endogenous factors of the wireless communication network protocol is constructed, and the construction includes the following four sub-steps.

At S11, entities are defined. 247 pieces of control plane data and indicators of N1N2 interfaces of the core network, which can be used as four entity types, namely a process type, a data field type, a statistical type data indicator, and an algorithm type data indicator, are determined according to the provisions of the wireless communication protocol such as a 3GPP protocol. In this embodiment, the process type is 1-registration, the data field type is msgflag, the statistical data type is registration success cnt, and the algorithm data type is registration success rate. The entity type contains entity attributes, configured to reflect the entity's names, features and parameters. The features are configured to describe the properties of the entity that are different from other entities, such as a type and a word length, and the parameters are configured to describe values of specific attributes of an entity object, such as numerical values. For example, the entity with the name msgflag is of the type unsigned int, with a word length of 1 and the numerical values of 0, 1, 2, 3, 4.

At S12, a connection relation is defined. The number of connection relations, including process, conditional, and algorithm relations between 247 entities, is determined to 2305 according to the existing wireless communication protocol.

At S13, a triple is defined. 2305 groups of universal triplets for an entity having a connection relation in the wireless communication protocol are constructed based on the defined entities and the connection relation.

Figure 2:
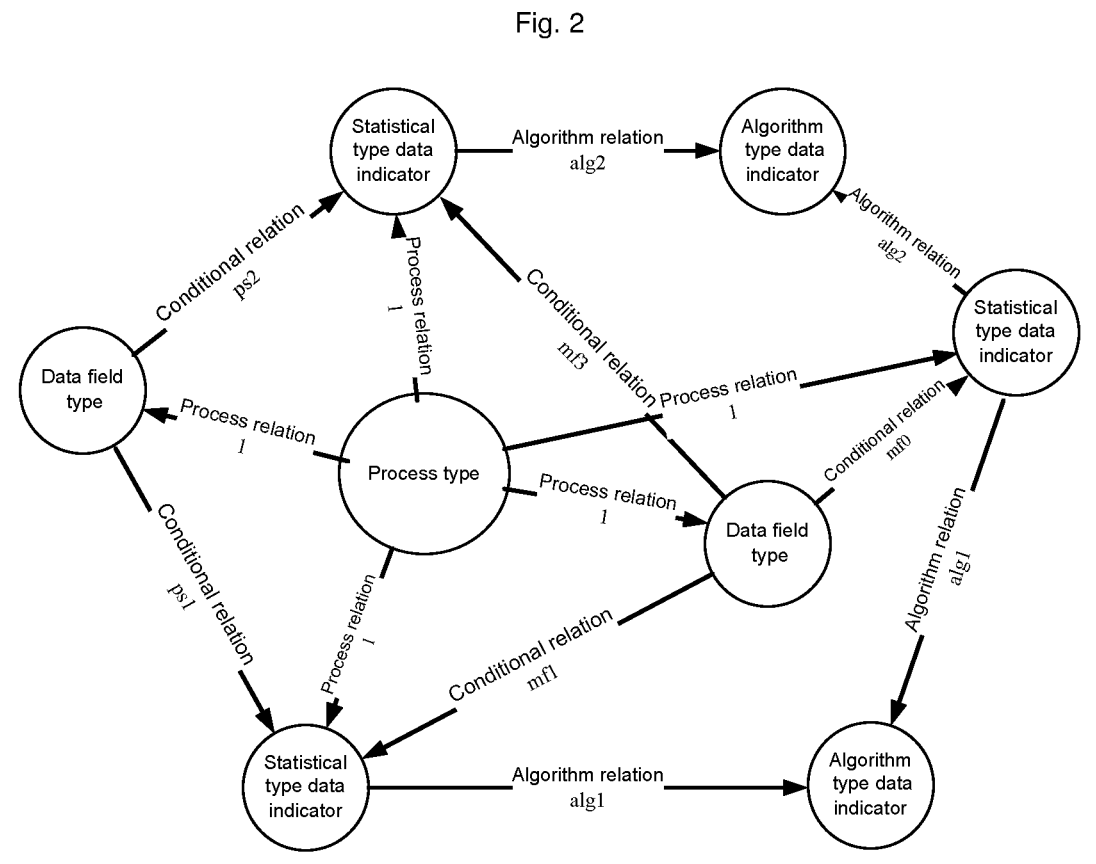

At S14, the knowledge graph is constructed. All entity nodes that have the relations are connected after taking a head entity and a tail entity of the triplet as the nodes of the knowledge graph, and taking the connection relation as an edge between the nodes, so that the knowledge graph of the endogenous factors of the wireless communication network protocol is obtained, wherein the knowledge graph has a topology. There are 247 nodes and 2305 connection relations of the knowledge graph of the endogenous factors of the wireless communication network protocol. FIG. 2 shows a local structure of the knowledge graph of the endogenous factors of the wireless communication network protocols in the embodiment. The knowledge graph is stored in the form of graph data using graph database technology, the data representation centered on association data and the query of multiple connection relations are realized by database query languages, and the more complex functions such as query and inference for graph matching are realized by a graph algorithm.

At S2, the operation of performing association analysis between any nodes in the knowledge graph includes the following sub-steps.

At S21, sparse representation vectors of the nodes are calculated. The sparse representation vectors of the nodes of the knowledge graph are obtained by calculating the random state weights of the nodes, and a specific process is as follows.

An initial random state weight is set as $$v_0 = \left(\frac{1}{N}, \frac{1}{N}, \ldots, \frac{1}{N}\right)^T,$$

where N=247. The random state weight is obtained by iteration through formula (1). A random state transition probability correction matrix T is obtained by calculating the random state transition probability matrix S through formula (2), where a random state transition probability parameter is $\alpha=0.85$, and a column vector is e=[1, 1, . . . , 1]$^T$. The iteration terminates when a condition $\|v_{n+1}-v_n\| <$o is met, where o=$10^{-6}$.

At S22, a cosine similarity between the sparse representation vectors is calculated. The similarity between the nodes is evaluated by calculating the cosine similarity between the sparse representation vectors of the nodes in the knowledge graph through formula (3). In this embodiment, the cosine similarity between the sparse representation vector of the node 1-registration and the sparse representation vector of the node msgflag is 0.0092, and the cosine similarity between the sparse representation vector of the node msgflag and the sparse representation vector of the node registration success cnt is 0.218.

At S23, a structure of the knowledge graph is updated. There is a connection relation between the nodes having cosine similarity values between the sparse representation vectors higher than a cosine similarity threshold $\eta=0.2$. In this embodiment, the cosine similarity between the node 1-registration and the node msgflag is 0.0092, which is lower than the cosine similarity threshold $\eta=0.2$, so that the connection relation between node 1-registration and the node msgflag does not exist. The cosine similarity between the node msgflag and the node registration success cnt is 0.218, which is greater than the cosine similarity threshold $\eta=0.2$, so that the connection relation between the node msgflag and the node registration success cnt is considered to exist. The cosine similarity value determines the degree of similarity between the two sparse representation vectors. By replacing the connection relation relation determined by the protocol in the original knowledge graph with the quantified similarity, the update of the structure of the knowledge graph is completed. The total number of nodes before the update is 247, the total number of connection relations is 2305, the number of nodes of the knowledge graph after the update is 247, and the total number of quantized connection relations is 15,962. It can be seen that after the update of the connection relations, in addition to the connection relations already specified in the wireless communication network protocol, implicit connection relations between the nodes are also inferred, which facilitates the association analysis of the nodes in the knowledge graph in the later period.

FIG. 3 shows a local structure after an update of the knowledge graph structure of the endogenous factors of the wireless communication network protocol. In the figure, the thickness of a connection line reflects the strength of the association between two nodes. The stronger the association, the thicker the connection line; otherwise the weaker the association, the finer the connection line. The node's size reflects the number of nodes strongly related to the node in such data type. The larger the node, the more nodes are strongly associated with the node, and a threshold for determining a solid association is $c(x_u, x_v) \geq 0.95$.

At S24, the degree of association between the nodes and the feature vectors of the nodes are calculated. The feature vectors of the nodes are obtained by iterative calculation through formula (4), and in a learning rate function $$\delta(t) = \beta^{\frac{t}{K}}$$

about time t, an attenuation factor $\beta=0.9$, a constant of the number of attenuation steps K=10, and the condition for determining the termination is $\varepsilon=10^{-4}$. The degree of association of the nodes is obtained by calculating the norm of the association vectors given by formula (10), where the ideal length of the edge e is $l_e=0.06$.

From FIG. 2 and FIG. 3 in the embodiment, the method in the disclosure solves the problem of a "black core" of the association relation between the endogenous factors in the existing communication network architecture. It provides a visual, hierarchical and structured manner for researchers to dynamically understand the association between internal processes, data and indicators of the network. By effectively sorting out the existing information and knowledge and association rules through the knowledge graph in combination with a hierarchical association analysis model of knowledge organization, the construction of a training knowledge base for professionals is realized. The problem that existing teaching and training work is only limited to a specific network layer is solved, and the disclosure prospect and value are broad.

The disclosure has the following beneficial effects.

1. In the disclosure, by establishing the knowledge graph of the endogenous factors of the wireless communication network protocol, and introducing the node sparse representation algorithm, the cosine similarity calculation and node association analysis method which are based on the structure of the knowledge graph, the graph structure information contained in the knowledge graph is intensely mined, quantitative feature representation is performed on the nodes of the knowledge graph and the connection relation, analysis and mining of the association relation between the nodes are completed, the association relation hidden between the endogenous factors of the wireless communication network protocol is inferred, and then the association relation between the endogenous factors in the wireless communication network protocol is further mined.

2. The disclosure also uses an association analysis model to quantify the abstract knowledge graph of the wireless communication network protocol into a matrix form that can be described and calculated by the feature vectors. The knowledge graph in this representation form can be more easily extended and applied to entity prediction, relation prediction, recommendation algorithm, and semantic search scenarios.

The above description is merely the preferred implementation modes of the disclosure. It is to be noted that those of ordinary skill in the art may also make several improvements and refinements without departing from the principle of the disclosure. It should be considered that these improvements and refinements shall all fall within the scope of protection of the disclosure.

What is claimed is:

1. A method for constructing and analyzing a knowledge graph of a wireless communication network protocol, comprising:

defining entities and a relation between the entities according to endogenous factors of a wireless communication network protocol, the endogenous factors of the wireless communication network protocol comprising data fields and indicators, of a core network, which are specified by the wireless communication network protocol, a type of an entity being determined by the wireless communication network protocol, and comprising: a process type, a data field type, a statistical type data indicator, and an algorithm type data indicator;

defining a triplet based on the defined entities and the defined relation between the entities, wherein the relation between the entities is classified into a process relation, a conditional relation, and an algorithm relation, the process relation describes a correlation between an entity of the data field type and an entity of the process type, the conditional relation describes specific values of data fields associated with an entity of the statistical type data indicator when the entity of the statistical type data indicator takes effect, the algorithm relation describes a calculation method for converting an entity of the statistical type data indicator into an entity of the algorithm type data indicator;

constructing, according to the defined triplet, a knowledge graph of the endogenous factors of the wireless communication network protocol, the knowledge graph having a topology, wherein the entity servers as a node of the knowledge graph, the relation between the entities servers as an edge between nodes, a thickness of the edge reflects a strength of the relation between two nodes, the stronger the relation, the thicker the edge; the node's size reflects the number of nodes strongly related to the node in such data type, the larger the node, the more nodes are strongly associated with the node;

performing association analysis between any nodes in the knowledge graph to acquire an association relation hidden between the endogenous factors of the wireless communication network protocol;

wherein the performing association analysis between any nodes in the knowledge graph to acquire an association relation hidden between the endogenous factors of the wireless communication network protocol comprises: obtaining a sparse representation vector of each node by calculating a random state weight of each node in the knowledge graph; quantifying a connection relation between the nodes by calculating a cosine similarity between the sparse representation vectors of the nodes; replacing the relation between the entities defined by the endogenous factors of the wireless communication network protocol in an original knowledge graph with the connection relation between the nodes quantified by the cosine similarity between the sparse representation vectors of the nodes to update a structure of the knowledge graph; and calculating an association vector of each node based on the updated structure of the knowledge graph and the cosine similarity, and calculating a feature vector of the node through the association vector, the feature vector being configured for quantitative representation of the knowledge graph; and storing the knowledge graph in the form of graph data using graph database technology, querying to obtain multiple connection relations centered on association data by database query languages, and obtaining a query and inference result for graph matching by a graph algorithm.

2. The method for constructing and analyzing the knowledge graph of the wireless communication network protocol as claimed in claim 1, wherein the entity comprises a head entity and a tail entity; the defining a triplet based on the defined entities and the defined relation between the entities comprises:

defining the triplet as (head, relation, tail), wherein head is the head entity in the triplet, tail is the tail entity in the triplet, and relation is the relation between the entities;

the constructing, according to the defined triplet, a knowledge graph of the endogenous factors of the wireless communication network protocol, the knowledge graph having a topology comprises:

connecting all entity nodes that have the relations by taking the head entity and the tail entity of the triplet as nodes of the knowledge graph, and taking the relation between the entities as an edge between the nodes to obtain the knowledge graph of the endogenous factors of the wireless communication network protocol, wherein the knowledge graph has the topology, and each node represents the data field or indicator of one core network.

3. The method for constructing and analyzing the knowledge graph of the wireless communication network protocol as claimed in claim 1, wherein the entity contains entity attributes mapped to the entity, and the entity attributes comprises names, features and parameters of the entity.

4. The method for constructing and analyzing the knowledge graph of the wireless communication network protocol as claimed in claim 3, wherein the features of the entity comprise the entity type and a word length, and the parameters of the entity comprise numerical values of the entity.

5. The method for constructing and analyzing the knowledge graph of the wireless communication network protocol as claimed in claim 1, wherein the obtaining a sparse representation vector of each node by calculating a random state weight of each node in the knowledge graph comprises: obtaining the random state weight by iterative calculation of a random state transition probability correction matrix, a calculation formula thereof being:

$$T = \alpha S + \frac{1-\alpha}{N} e e^T$$

where $v_{n+1}$ is a random state weight matrix of all the nodes after (n+1)-th iteration, $v_n$ is a random state weight matrix of all the nodes after the n-th iteration, T is the random state transition probability correction matrix, α is a random state transition probability parameter, S is a random state transition probability matrix, e is column vectors whose values are all 1, and N is the total number of nodes in the knowledge graph.

6. The method for constructing and analyzing the knowledge graph of the wireless communication network protocol as claimed in claim 1, wherein the calculating a feature vector of the node through the association vector comprises: obtaining the feature vector by iterative calculation of a learning rate function and a feature offset vector, a calculation formula thereof being:

$$p_{u,t+1}=p_{u,t}+\delta(t)f_{offset,t}(u)$$

$$f_{offset,t}(u)=f_{assoc,t}(u)+f_{sep,t}(u)$$

where $p_{u,t+1}$ is the feature vector of the node u at time point t+1, $p_{u,t}$ is the feature vector of the node u at time point t, $\delta(t)$ is a learning rate function about time point t, $f_{offset,t}(u)$ is the feature offset vector of the node u at time point t, $f_{assoc,t}(u)$ is the association vector of the node u at time point t, and $f_{sep,t}(u)$ is a separation vector of the node u at time point t.

7. An electronic device, comprising a memory, a processor, and a computer program stored in the memory and runnable on the processor, wherein the processor implements following actions when executing the program:

defining entities and a relation between the entities according to endogenous factors of a wireless communication network protocol, the endogenous factors of the wireless communication network protocol comprising data fields and indicators, of a core network, which are specified by the wireless communication network protocol, a type of an entity being determined by the wireless communication network protocol, and comprising: a process type, a data field type, a statistical type data indicator, and an algorithm type data indicator;

defining a triplet based on the defined entities and the defined relation between the entities, wherein the relation between the entities is classified into a process relation, a conditional relation, and an algorithm relation, the process relation describes a correlation between an entity of the data field type and an entity of the process type, the conditional relation describes specific values of data fields associated with an entity of the statistical type data indicator when the entity of the statistical type data indicator takes effect, the algorithm relation describes a calculation method for converting an entity of the statistical type data indicator into an entity of the algorithm type data indicator;

constructing, according to the defined triplet, a knowledge graph of the endogenous factors of the wireless communication network protocol, the knowledge graph having a topology, wherein the entity servers as a node of the knowledge graph, the relation between the entities servers as an edge between nodes, a thickness of the edge reflects a strength of the relation between two nodes, the stronger the relation, the thicker the edge; the node's size reflects the number of nodes strongly related to the node in such data type, the larger the node, the more nodes are strongly associated with the node;

performing association analysis between any nodes in the knowledge graph to acquire an association relation hidden between the endogenous factors of the wireless communication network protocol;

wherein the performing association analysis between any nodes in the knowledge graph to acquire an association relation hidden between the endogenous factors of the wireless communication network protocol comprises: obtaining a sparse representation vector of each node by calculating a random state weight of each node in the knowledge graph; quantifying a connection relation between the nodes by calculating a cosine similarity between the sparse representation vectors of the nodes; replacing the relation between the entities defined by the endogenous factors of the wireless communication network protocol in an original knowledge graph with the connection relation between the nodes quantified by the cosine similarity between the sparse representation vectors of the nodes to update a structure of the knowledge graph; and calculating an association vector of each node based on the updated structure of the knowledge graph and the cosine similarity, and calculating a feature vector of the node through the association vector, the feature vector being configured for quantitative representation of the knowledge graph; and storing the knowledge graph in the form of graph data using graph database technology, querying to obtain multiple connection relations centered on association data by database query languages, and obtaining a query and inference result for graph matching by a graph algorithm.

8. The electronic device as claimed in claim 7, wherein the defining entities and a relation between the entities according to endogenous factors of a wireless communication network protocol comprises:

acquiring the endogenous factors of the wireless communication network protocol, determining entity types according to the endogenous factors of the wireless communication network protocol, and defining the entities according to the entity types; and classifying the relation between the entities into a process relation, a conditional relation, and an algorithm relation according to the wireless communication network protocol, and defining the relation between the entities as at least one of the process relation, the conditional relation, and the algorithm relation according to the endogenous factors of the wireless communication network protocol, wherein the process relation is configured to describe a correlation between an entity of a data field type and an entity of a process type, the conditional relation is configured to describe specific values of the data fields associated with an entity of a statistical type data indicator when the entity of the statistical type data indicator takes effect, and the algorithm relation is configured to describe a calculation method for converting the entity of the statistical type data indicator into an entity of an algorithm type data indicator.

9. The electronic device as claimed in claim 8, wherein the entity types comprise at least one of the process type, the data field type, the statistical type data indicator, and the algorithm type data indicator.

10. The electronic device as claimed in claim 8, wherein the entity comprises a head entity and a tail entity; the defining a triplet based on the defined entities and the defined relation between the entities comprises:

defining the triplet as (head, relation, tail), wherein head is the head entity in the triplet, tail is the tail entity in the triplet, and relation is the relation between the entities;

the constructing, according to the defined triplet, a knowledge graph of the endogenous factors of the wireless communication network protocol, the knowledge graph having a topology comprises:

connecting all entity nodes that have the relations by taking the head entity and the tail entity of the triplet as nodes of the knowledge graph, and taking the relation between the entities as an edge between the nodes to obtain the knowledge graph of the endogenous factors of the wireless communication network protocol, wherein the knowledge graph has the topology, and each node represents the data field or indicator of one core network.

11. A non-transitory computer readable storage medium, on which a computer-executable instruction is stored, and when executed by a processor, the computer-executable instruction implementing following actions:

defining entities and a relation between the entities according to endogenous factors of a wireless communication network protocol, the endogenous factors of the wireless communication network protocol comprising data fields and indicators, of a core network, which are specified by the wireless communication network protocol, a type of an entity being determined by the wireless communication network protocol, and comprising: a process type, a data field type, a statistical type data indicator, and an algorithm type data indicator;

defining a triplet based on the defined entities and the defined relation between the entities, wherein the relation between the entities is classified into a process relation, a conditional relation, and an algorithm relation, the process relation describes a correlation between an entity of the data field type and an entity of the process type, the conditional relation describes specific values of data fields associated with an entity of the statistical type data indicator when the entity of the statistical type data indicator takes effect, the algorithm relation describes a calculation method for converting an entity of the statistical type data indicator into an entity of the algorithm type data indicator;

constructing, according to the defined triplet, a knowledge graph of the endogenous factors of the wireless communication network protocol, the knowledge graph having a topology, wherein the entity servers as a node of the knowledge graph, the relation between the entities servers as an edge between nodes, a thickness of the edge reflects a strength of the relation between two nodes, the stronger the relation, the thicker the edge; the node's size reflects the number of nodes strongly related to the node in such data type, the larger the node, the more nodes are strongly associated with the node;

performing association analysis between any nodes in the knowledge graph to acquire an association relation hidden between the endogenous factors of the wireless communication network protocol;

wherein the performing association analysis between any nodes in the knowledge graph to acquire an association relation hidden between the endogenous factors of the wireless communication network protocol comprises: obtaining a sparse representation vector of each node by calculating a random state weight of each node in the knowledge graph; quantifying a connection relation between the nodes by calculating a cosine similarity between the sparse representation vectors of the nodes; replacing the relation between the entities defined by the endogenous factors of the wireless communication network protocol in an original knowledge graph with the connection relation between the nodes quantified by the cosine similarity between the sparse representation vectors of the nodes to update a structure of the knowledge graph; and calculating an association vector of each node based on the updated structure of the knowledge graph and the cosine similarity, and calculating a feature vector of the node through the association vector, the feature vector being configured for quantitative representation of the knowledge graph; and storing the knowledge graph in the form of graph data using graph database technology, querying to obtain multiple connection relations centered on association data by database query languages, and obtaining a query and inference result for graph matching by a graph algorithm.

* * * * *